(12) United States Patent
Hooli et al.

(10) Patent No.: US 11,575,583 B2
(45) Date of Patent: Feb. 7, 2023

(54) SYSTEM AND METHOD FOR IMPROVING MACHINE LEARNING MODEL PERFORMANCE IN A COMMUNICATIONS NETWORK

(71) Applicant: TELEFONAKTIEBOLAGET LM ERICSSON (PUBL), Stockholm (SE)

(72) Inventors: Mayuresh Hooli, Dallas, TX (US); Miroslav Budic, Murphy, TX (US); Pulin Chhatbar, Plano, TX (US); Nirav Gohel, Southlake, TX (US); Narendra Tilwani, McKinney, TX (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 22 days.

(21) Appl. No.: 17/312,408

(22) PCT Filed: Nov. 13, 2019

(86) PCT No.: PCT/IB2019/059767
§ 371 (c)(1),
(2) Date: Jun. 10, 2021

(87) PCT Pub. No.: WO2020/121084
PCT Pub. Date: Jun. 18, 2020

(65) Prior Publication Data
US 2022/0029892 A1    Jan. 27, 2022

Related U.S. Application Data

(60) Provisional application No. 62/777,946, filed on Dec. 11, 2018.

(51) Int. Cl.
*H04L 41/16* (2022.01)
*H04L 41/0823* (2022.01)
(Continued)

(52) U.S. Cl.
CPC .......... *H04L 41/16* (2013.01); *H04L 41/0823* (2013.01); *H04L 41/142* (2013.01); *H04L 41/145* (2013.01); *H04L 41/147* (2013.01)

(58) Field of Classification Search
CPC ... H04L 41/16; H04L 41/0823; H04L 41/142; H04L 41/145; H04L 41/147
See application file for complete search history.

(56) References Cited

U.S. PATENT DOCUMENTS 7,571,069 B1 * 8/2009 Farkas ................... G06Q 10/06
717/124
9,900,790 B1    2/2018 Sheen et al.
(Continued)

OTHER PUBLICATIONS

Mobility Pattern Prediction based on Machine Learning, status May 22, 2018, Incorporates changes proposed in ML5G-I-050 and discussion on conference call May 16, 2018; ML5G-I-049-R2 (Year: 2018).*

(Continued)

*Primary Examiner* — Philip C Lee
(74) *Attorney, Agent, or Firm* — Christopher & Weisberg, P.A.

(57) ABSTRACT

A system, method and non-transitory computer readable media for optimizing input data for an ML model associated with a communications network. In one implementation, example ML model(s) may be trained using a modified dataset obtained for a plurality of cellular aggregation units (CAUs) of the RAN infrastructure(s), wherein the modified dataset is derived from data collected for individual CAUs over a data collection period with respect to a plurality of KPI variables. The modified data set is optimized by replacement of null values of variables with corresponding modal values of the variables. The trained ML model may be used for predicting one or more KPIs based on a set of test data associated with the RAN infrastructure(s).

11 Claims, 8 Drawing Sheets

(51) Int. Cl.
    *H04L 41/142*      (2022.01)
    *H04L 41/14*      (2022.01)
    *H04L 41/147*      (2022.01)

(56) References Cited

U.S. PATENT DOCUMENTS

| | | | |
|---|---|---|---|
| 10,733,515 B1* | 8/2020 | Mishra | G06N 20/00 |
| 2019/0087475 A1* | 3/2019 | Nagey | G06F 16/258 |
| 2019/0132224 A1* | 5/2019 | Verma | H04L 43/062 |
| 2019/0259041 A1* | 8/2019 | Jackson | G06Q 10/06315 |
| 2019/0294689 A1* | 9/2019 | Mathur | G06F 16/24578 |

OTHER PUBLICATIONS

Yeganeh, Naiem Khodabandhloo et al.: "A study of data quality issues in mobile telecom operators", 10th International Conference on Enterprise Information Systems, Barcelona, Spain, Jun. 12-16, 2008. Setubal, Portugal: INSTICC Press, 13 pages.

Pliatsios, D., et al.: "Realizing 5G vision through Cloud RAN: technologies, challenges, and trends", EURASIP Journal on Wireless Communications and Networking (2018) May 2018, https://doi.org/10.1186/s13638-018-1142-1, 15 pages.

Qiu Yaxing, et al., "Mobility Pattern Prediction based on Machine Learning, status May 22, 2018. Incorporates changes proposed in ML5G-I-050 and discussion on conference call May 16, 2018;ML5G-I-049-R2", ITU-T Draft Study Period 2017-2020; Focus Group ML5G; Series ML5G-I-049-R2, International Telecommunication Union, Geneva; CH; vol. ML5G, Jul. 18, 2018 (Jul. 18, 2018), pp. 1-12, XP044249971.

* cited by examiner

SYSTEM AND METHOD FOR IMPROVING MACHINE LEARNING MODEL PERFORMANCE IN A COMMUNICATIONS NETWORK

PRIORITY AND CROSS-REFERENCE TO RELATED APPLICATION(S)

This application is a 35 U.S.C. § 371 National Stage filing of PCT/IB2019/059767, filed Nov. 13, 2019, which claims the benefit of the following prior United States provisional patent application(s): (i) "DATA CLEANING STACK FOR SMALL CELL," Application No.: 62/777,946, filed Dec. 11, 2018, in the name(s) of Mayuresh Hooli et al.; each of which is hereby incorporated by reference in its entirety.

TECHNICAL FIELD

The present disclosure generally relates to communication networks. More particularly, and not by way of any limitation, the present disclosure is directed to a system, method, apparatus and associated computer readable media for improving machine learning (ML) model performance in a communications network.

BACKGROUND

Mobile networks are rapidly evolving while the industry is struggling to keep up with the rising demand of connectivity, data rates, capacity, and bandwidth. Next Generation mobile networks (e.g., 5th generation or 5G) are particularly faced with the challenge of providing a quantum-change in capability due to the explosion of mobile device usage, expansion to new use-cases not traditionally associated with cellular networks, and the ever-increasing capabilities of the end-user devices. The requirements for 5G are also manifold, as it is envisaged that it will cater for high-bandwidth high-definition streaming and conferencing, to machine interconnectivity and data collection for the Internet-of-Things (IoT), and to ultra-low latency applications such as autonomous vehicles as well as augmented reality (AR), virtual reality (VR) or mixed reality (MR) applications, and the like. The evolution toward 5G mobile networks is also driven by the diverse requirements of a multitude of new use cases in the areas of enhanced mobile broadband (eMBB), ultra-reliable low-latency communication (URLLC) and massive machine-to-machine (M2M) communications, among others. Along with a demand for lower costs, these drivers have led to the development of various radio access network (RAN) architectures to support multiple deployment models.

In view of the volume, scale, and velocity of data gathered with respect to the management of current network implementations, all of which will inevitably grow in the future when Next Generation Networks are deployed, there is a resurgence of interest in techniques such as machine learning (ML), especially in the context of predictive modeling related to network performance. Although advances in ML techniques continue to take place, there is a still a tendency for ML-based models to fail when applied in the field of telecommunications, thereby requiring further innovation as will be set forth hereinbelow.

SUMMARY

The present patent disclosure is broadly directed to systems, methods, apparatuses, devices, and associated non-transitory computer-readable media for optimizing input data for an ML model associated with a communications network, e.g., one or more RAN infrastructures disposed therein. In one implementation, example ML model(s) may be trained using a modified dataset obtained for a plurality of RAN infrastructure elements or entities, wherein the modified dataset is derived from data collected for respective infrastructure elements over a data collection period with respect to a plurality of variables relating to the network Key Performance Indicators or KPIs. The modified data set may be optimized by replacing null values of variables with corresponding modal values of the variables, wherein the modal values are determined over the data distribution obtained over the data collection period. In one implementation, the trained ML model may be used for predicting one or more KPIs based on a set of test data associated with the RAN infrastructure(s). In a related aspect, one or more control inputs may be provided to RAN management in response to the predicted KPIs so as to effectuate a resource configuration adjustment with respect to the RAN infrastructure(s).

In one aspect, an embodiment of a data cleaning process with respect to the input dataset comprises, inter alia, separating the data into a plurality of data frames, each data frame identified by an object identifier and corresponding to a respective individual RAN infrastructure element or cellular aggregation unit (CAU); and performing one or more of select data culling operations to obtain a reduced input dataset. In one embodiment, data frames that have less than a threshold number of rows for each data frame may be removed. In one embodiment, empty columns, e.g., columns associated with the variables that do not contain any data over the data collection period, may be removed from the dataset. In one embodiment, sparse columns corresponding to the variables from each data frame that have less than a select number of entries over the data collection period may also be removed from the dataset. In one embodiment, data frames that have less than a select number of variables corresponding to a designated number of valid KPIs may also be removed from the dataset. After performing one or more of the foregoing operations, a reduced dataset is obtained, which is further modified by replacing null values with the modal values of a variable in a data frame for a corresponding CAU.

In still further aspects, one or more network nodes or elements are disclosed, each comprising at least one processor and persistent memory having program instructions stored thereon, wherein the program instructions are configured to perform an embodiment of the methods set forth herein when executed by the respective at least one processor.

Further features of the various embodiments are as claimed in the dependent claims.

Embodiments of the present disclosure advantageously facilitate improved data curation and preparation with respect to the data obtained from various performance counters and mobile network KPIs collected at different levels of aggregation granularity. Modal value replacement of null values as set forth herein is particularly useful with respect to various types of data collected in RAN networks, e.g., including but not limited to categories such as cardinal data, nominal data, ordinal data, rank order data, continuous variable data, discrete variable data, categorical data, boolean data, and the like. Imputation of missing values by the mode of a distribution according to example embodiments is better suited for skewed distributions of data, which increases reliability and consistency of an ML input dataset, thereby further contributing to better predictive modeling of RAN performance.

These and other advantages will be readily apparent to one of skill in the art in light of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION

Figure 1:
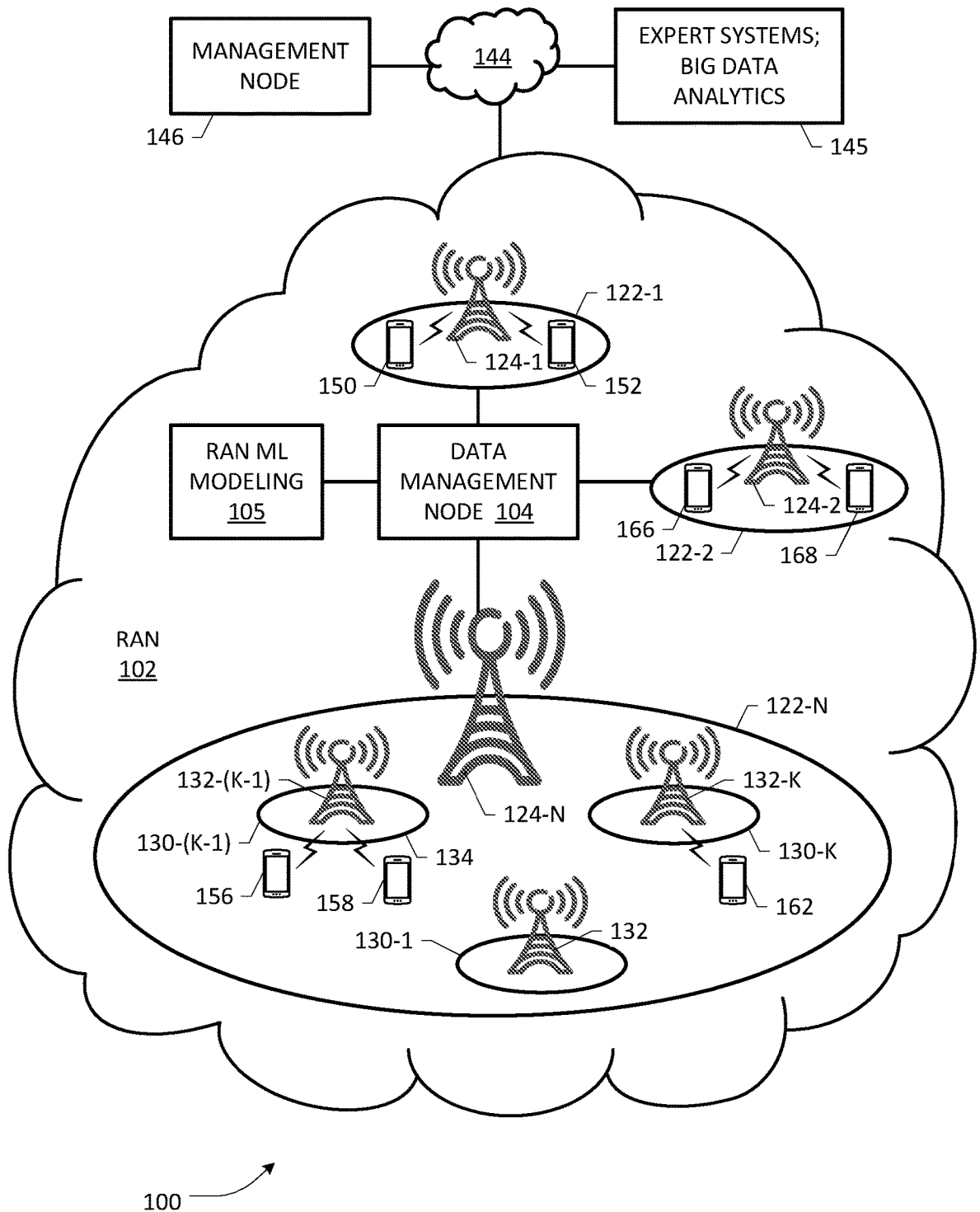
FIG. 1 depicts an example mobile communications network environment including one or more radio access network (RAN) infrastructures wherein an embodiment of the present patent disclosure may be practiced in accordance with the teachings herein.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged or programmed under suitable executable code to perform that function.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate, mutatis mutandis. Likewise, any advantage of any of the embodiments may apply to any other embodiments, and vice versa. Other objectives, features and advantages of the enclosed embodiments will be apparent from the following description.

As used herein, a network element, platform or node may be comprised of one or more pieces of service network equipment, including hardware and software that communicatively interconnects other equipment on a network (e.g., other network elements, end stations, etc.), and is adapted to host one or more applications or services with respect to a plurality of subscriber or users, and associated client devices as well as other endpoints, each executing suitable client applications configured to consume various data/voice/media services as well as sense/collect various types of data, information, measurements, etc. As such, some network elements may be disposed in a terrestrial cellular communications network, a non-terrestrial network (NTN) (e.g., a satellite telecommunications network including, inter alia, one or more communications satellites, high-altitude platform stations (HAPS)—which may be tethered or untethered, etc.), or a broadband wireline network, whereas other network elements may be disposed in a public packet-switched network infrastructure (e.g., the Internet or worldwide web, also sometimes referred to as the "cloud"), private packet-switched network infrastructures such as Intranets and enterprise networks, as well as service provider network infrastructures, any of which may span or involve a variety of access networks and core networks in a hierarchical arrangement. In still further arrangements, one or more network elements may be disposed in cloud-based platforms or data centers having suitable equipment running virtualized functions or applications relative to one or more processes set forth hereinbelow.

Example end stations and client devices (broadly referred to as User Equipment or UE devices) may comprise any device configured to consume and/or create any service via one or more suitable access networks or edge network arrangements based on a variety of access technologies, standards and protocols, including a heterogeneous network environment in some embodiments. Accordingly, example UE devices may comprise various classes of devices, e.g., multi-mode UE terminals including terminals adapted to communicate using NTN communications infrastructure(s), terrestrial cellular communications infrastructure(s), or WiFi communications infrastructure(s), or any combination thereof, as well as smartphones, multimedia/video phones, mobile/wireless user equipment, portable media players, Internet appliances, smart wearables such as smart watches, portable laptops, netbooks, palm tops, tablets, phablets, mobile phones, IoT devices and sensors, connected vehicles (manual and/or autonomous), and the like, as well as networked or local gaming devices/consoles including augmented reality (AR), virtual reality (VR) or mixed reality (MR) devices, and the like, each having at least some level of radio network communication functionalities for accessing suitable RAN infrastructures according to some example implementations.

One or more embodiments of the present patent disclosure may be implemented using different combinations of software, firmware, and/or hardware in one or more modules suitably programmed and/or configured. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present patent disclosure.

Referring to the drawings and more particularly to FIG. 1, depicted therein is an example mobile communications network environment 100 including one or more radio access network (RAN) infrastructures 102 wherein an embodiment of the present patent disclosure may be practiced in accordance with the teachings herein. In general, RAN infrastructure 102 is representative of any RAN infrastructure based on one or more radio access technologies (RATs) and/or protocols, such as, e.g., including at least one of a Long Term Evolution (LTE) infrastructure, a Global System for Mobile Communications (GSM) radio access network (GRAN) infrastructure, an Enhanced Data Rates for Global System for Mobile Communications (GSM) Evolution (EDGE) network (GERAN) infrastructure, a $3^{rd}/4^{th}/5^{th}$ Generation Partnership Project (3/4/5GPP) network infrastructure, an Integrated Digital Enhanced Network (IDEN) infrastructure, a WiMAX infrastructure, a heterogeneous access network infrastructure, a Code Division Multiple Access (CDMA) network infrastructure, a Universal Mobile Telecommunications System (UMTS) network infrastructure, a Universal Terrestrial Radio Access Network (UTRAN) infrastructure, an All-IP Next Generation Network (NGN) infrastructure, an 802.11 class WiFi communications infrastructure, a HiperLAN infrastructure, and a HiperMAN infrastructure, an NTN infrastructure, as well as any other known or heretofore unknown access technologies in the licensed and/or unlicensed spectra, and/or any combination thereof. Accordingly, an example RAN infrastructure 102 may be configured to effectuate one or more coverage areas comprising macrocells, microcells, small cells, femtocells, picocells, metrocells, metro femtocells, public access femtocells, enterprise femtocells, super femtos, Class 3 femto cells, etc., wherein the RAN infrastructure 102 may include a diverse array of network elements or nodes such as, e.g., eNodeBs (eNBs), gNodeBs (gNBs), home eNodeBs (HeNBs), radio network controller (RNC) nodes, remote radio units (RRUs), micro RRUs, remote radio heads (RRHs), micro RRHs, distributed units (DUs), baseband units (BBUs), BBU hubs, base transceiver stations (BTSs), base station controllers (BSCs), base station subsystems (BSSs), and the like. Further, the RAN infrastructure 102 may be operated by one or more mobile network operators (MNOs) and/or one or more mobile virtual network operators (MVNOs). Some implementations of RAN 102 may also include at least a portion in a virtualization environment, e.g., involving one or more virtual RAN nodes such as, e.g., virtual eNodeBs, virtual gNodeBs, virtual BBUs, virtual BBU hubs, and virtual RNCs, and the like, such that at least portions of the RAN infrastructure may be virtualized as a virtual RAN.

Regardless of the diversity and heterogeneity of RAN infrastructure(s) 102, nodes 124-1 to 124-N are generally representative of any of the foregoing nodes and may be configured to effectuate respective cellular coverage areas 122-1 to 122-N, each serving one or more UE devices, wherein at least some nodes may comprise macro, or high-power, base stations configured to effectuate respective macrocells that may include one or more micro cells, small cells, etc. For example, UE devices 150, 152 and UE devices 166, 168 are illustrative of devices or end stations served by nodes 124-1 and 124-2, respectively. Node 124-N is illustrative of a macro node effectuating a coverage area 122-N that may include one or more low-power base stations 132-1 to 132-K for effectuating corresponding small cells 130-1 to 130-K. It will be appreciated that low power base stations 132-1 to 132-K may include but are not limited to, e.g., micro base stations, pico base stations, femto base stations, and/or relay base stations, as noted above. Example UE devices 156, 158, 162 disposed in the cellular area 122-N may be served by any of the low-power nodes 132-1 to 132-K and/or the macro node 124-N depending on one or more network parameters such as, e.g., available radio resources, signal strengths, noise and/or interference levels, traffic conditions, operator/service policies, etc. Typically, example low-power base stations 132-1 to 132-K may deployed to eliminate coverage gaps in the macro layer of RAN 102 (e.g., the layer of macro base stations such as node 124-N), mitigate the shadow fading effect, and improve the capacity in network traffic hot spots. In at least one embodiment, low-power base stations 132-1 to 132-K may be configured to provide denser coverage capable of providing high-speed, wideband downlink services in metropolitan areas through, for example, one or more millimeter wave base stations. Due to their low transmit power and smaller physical size, the low-power base stations 132-1 to 132-K can offer flexible site acquisitions, potentially facilitating densely packed deployment in urban/metropolitan environments.

Example RAN infrastructure(s) 102 may be coupled to one or more core networks (CN) 144 via suitable backhaul network connectivity, which may be managed as a single core network provided by a single service provider or as separate core networks provided by different service providers. One or more management nodes 146 attached to core network(s) 144 may be configured to provide operations, administration and management (OAM) support with respect to the operations of core network(s) 144 and/or the operations of the RANs 102. In one embodiment, management node(s) 146 may be configured to support various multi-level functionalities with respect to the CN/RAN performance, management and administration such as e.g., Business Management Level (BML), Service Management Level (SML), Network Management Level (NML) and Element Management Level (EML). Whereas management node 146(s) may be provided as an integral portion of core network(s) 144 in some embodiments, such management functionality may also be provided via separate networks or platforms, e.g., by a third party service provider, in additional and/or alternative embodiments. As technologies such as Software Defined Networking (SDN) and Network Function Virtualization (NFV) transform traditional networks into software programmable domains finning on simplified, lower cost hardware, management node 146 can be provided as a data center node and can further be present at different hierarchical layers within the network, e.g., management node 146 can be located at a separate entity, such as a Node C in a heterogeneous cloud or centralized radio access network (H-CRAN), as part of an SDN controller, at network edge nodes of a RAN rather than in the centralized core, a mobility management entity (MME), a packet/service-gateway (P/S-GW), a node in a multi-service management plane (MSMP), etc. Accordingly, in addition to providing management node 146 as a cloud based entity and/or part of a self-organizing network (SON) in some implementations, at least part of the functionality may be provided as a RAN data management node 104 for purposes of at least some embodiments of the present invention as will be set forth in detail further below.

One or more machine learning (ML) modules 105 may be provided with respect to various functional/structural aspects of RAN infrastructure(s) 102, wherein suitable ML techniques, models, processes, etc., may be configured for providing predictive analytics relative to RAN performance, management and/or administration. As part of a data-driven ML implementation architecture associated with the network environment 100, various network performance metrics as well as other variables may be classified according to certain Key Performance Indicators (KPIs) relative to the RAN infrastructure(s) 102, which may be used for predictive analytical modeling wherein "Big Data" analytics as well as expert systems may be augmented in some implementations. Platforms providing such analytics and expert systems may comprise network operator nodes and/or third-party service provider nodes, collectively exemplified by nodes 145. In some arrangements, example ML module(s) 105 may involve supervised and/or unsupervised ML techniques, support vector machines (SVMs) or support vector networks (SVNs), pattern recognition, artificial intelligence (AI) techniques, neural networks, and the like, which may be based on training suitable ML models using appropriate input data and applying the trained ML models to sets of test data or representative data for prediction of KPIs. Without limitation, example ML models may involve use case scenarios such as optimization of bearer traffic flows (e.g., video flows), radio resource allocation or reallocation, optimization of outage prediction and network reconfiguration, service rollout scheduling, etc. As set forth elsewhere in the present disclosure, although vast amounts of data may be collected for a RAN for purposes of ML-based modeling, obtaining accurate predictions is less than satisfactory because of the data quality issues inherent in mobile radio network data due to, e.g., the inconsistency of probability distributions associated with certain metrics relative to various RAN nodes, presence of extreme outliers, presence of different categories of performance variables, and the like. In accordance with the teachings of the present invention, example embodiments of management node 104 and/or 146 may be configured to provide a data preprocessing or data cleaning functionality with respect to the RAN data gathered for ML modeling purposes, whereby the accuracy and consistency of ML-based predictive modeling may be advantageously improved.

Figure 2A:
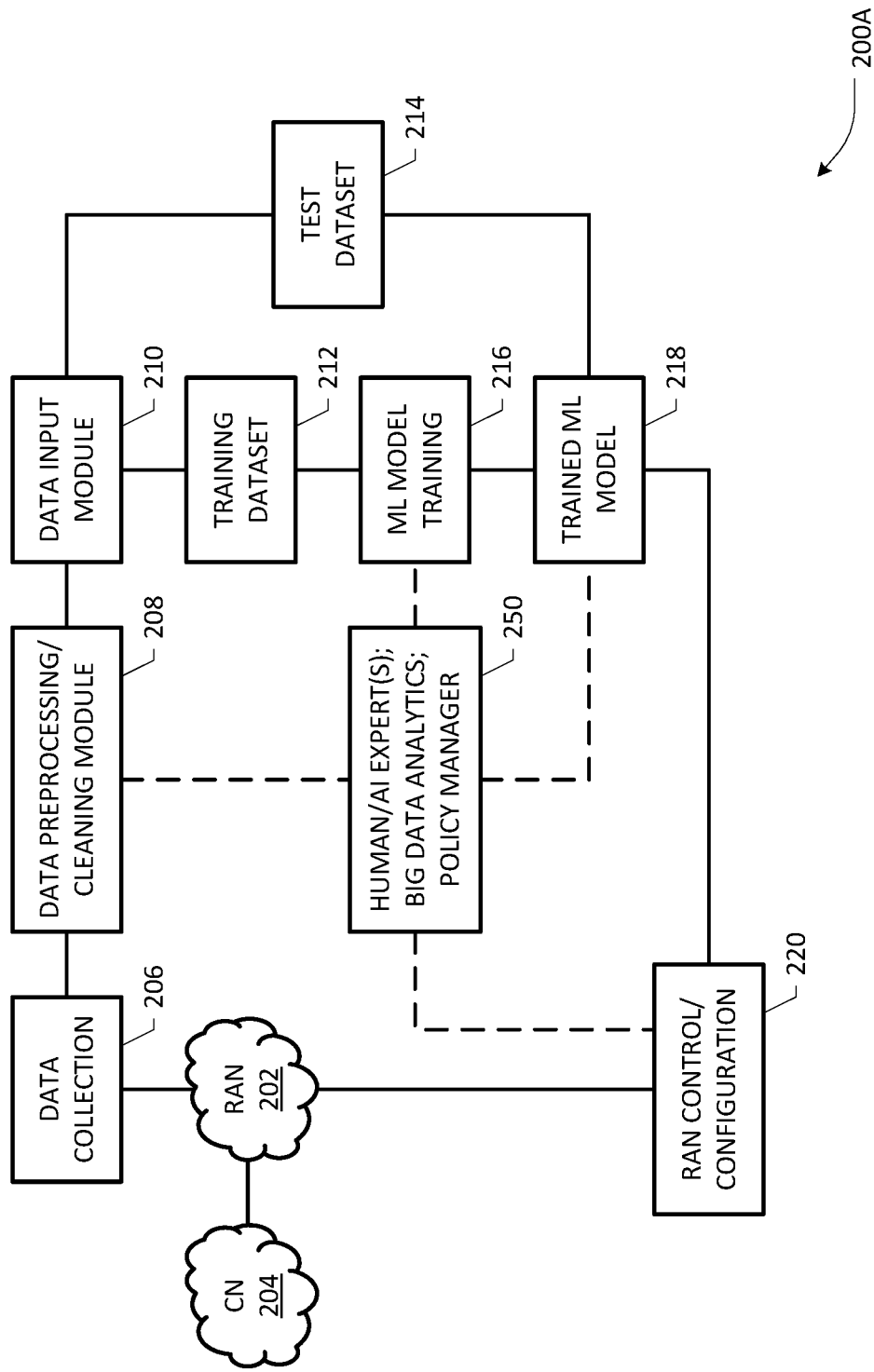
FIG. 2A depicts a block diagram of an apparatus, node, or network element functionality associated with a network portion for effectuating input data optimization and performance improvement of a mobile communications system based on machine learning (ML) modeling of RAN infrastructure(s) according to an embodiment of the present invention.

FIG. 2A depicts a block diagram of an apparatus, node, or network element functionality 200A associated with a network portion for effectuating input data optimization and performance improvement of a mobile communications system based on ML modeling of RAN infrastructure(s) according to an embodiment of the present invention. As illustrated, RAN 202 and CN 204 exemplify a representative mobile communications system, wherein RAN 202 may comprise one or more RAN infrastructures 102 described above. A data collection module 206 is operative to obtain data relating to a number of performance metrics, parameters or other variables, which may be measured, monitored, obtained, estimated, or otherwise determined for a number of RAN infrastructure elements of RAN 202, wherein the data may be collected periodically, e.g., responsive to a scheduler, or based on occurrence or detection of events, triggers, alarms, etc., or based on operator/management node policies, and the like. Further, the data may be collected via different techniques for different types of variables, RAN infrastructure elements, and the like, e.g., via pull techniques, push techniques, or a combination thereof. A data preprocessing or cleaning module 208 is operative to perform certain data cleaning operations, steps, acts, or functions, which may be guided/unguided or supervised/unsupervised, by human or AI-based experts 250 having knowledge and domain expertise relative to the RAN infrastructure, with respect to the input data obtained by the data collection module 206, as will be set forth in detail further below. A modified dataset may therefore be generated by the data preprocessing/cleaning module 208, which may be input by an input module 210 as a training dataset 212 to a specific ML model associated with or relative to one or more aspects of RAN 202. Depending on the particular ML implementation architecture associated with the network, ML model training 216 may involve one or more iterations, which in some instances may include (semi)supervised learning based on input from human/AI experts, such that a trained ML model 218 that is appropriately fitted is obtained i.e., resulting in a model without under-fitting or over-fitting, In one embodiment, the foregoing operations may be provided as part of the ML training stage or aspect of an example implementation. In a subsequent or separate phase, the fitted/trained ML model 218 may be used in conjunction with additional datasets of RAN 202 that are also preprocessed or cleaned by module 208, whereby suitable test datasets or validation datasets 214 may be used as input data for generating predictive output relative to one or more KPIs in a further example implementation. Accordingly, depending on the functionality of the trained ML model, appropriate control input(s) may be generated, provided or effectuated by human experts and/or policy managers 250 to (re)configure one or more structural and/or functional aspects of RAN 202 by way of a RAN control plane manager 220 in response to the predictions provided by the trained ML model 218. In some embodiments, the trained ML model 218 may also be configured to provide control input(s) to control plane manager 220 to effectuate autonomous operations with respect to RAN 202 responsive to the predicted KPIs and the like.

Figure 2B:
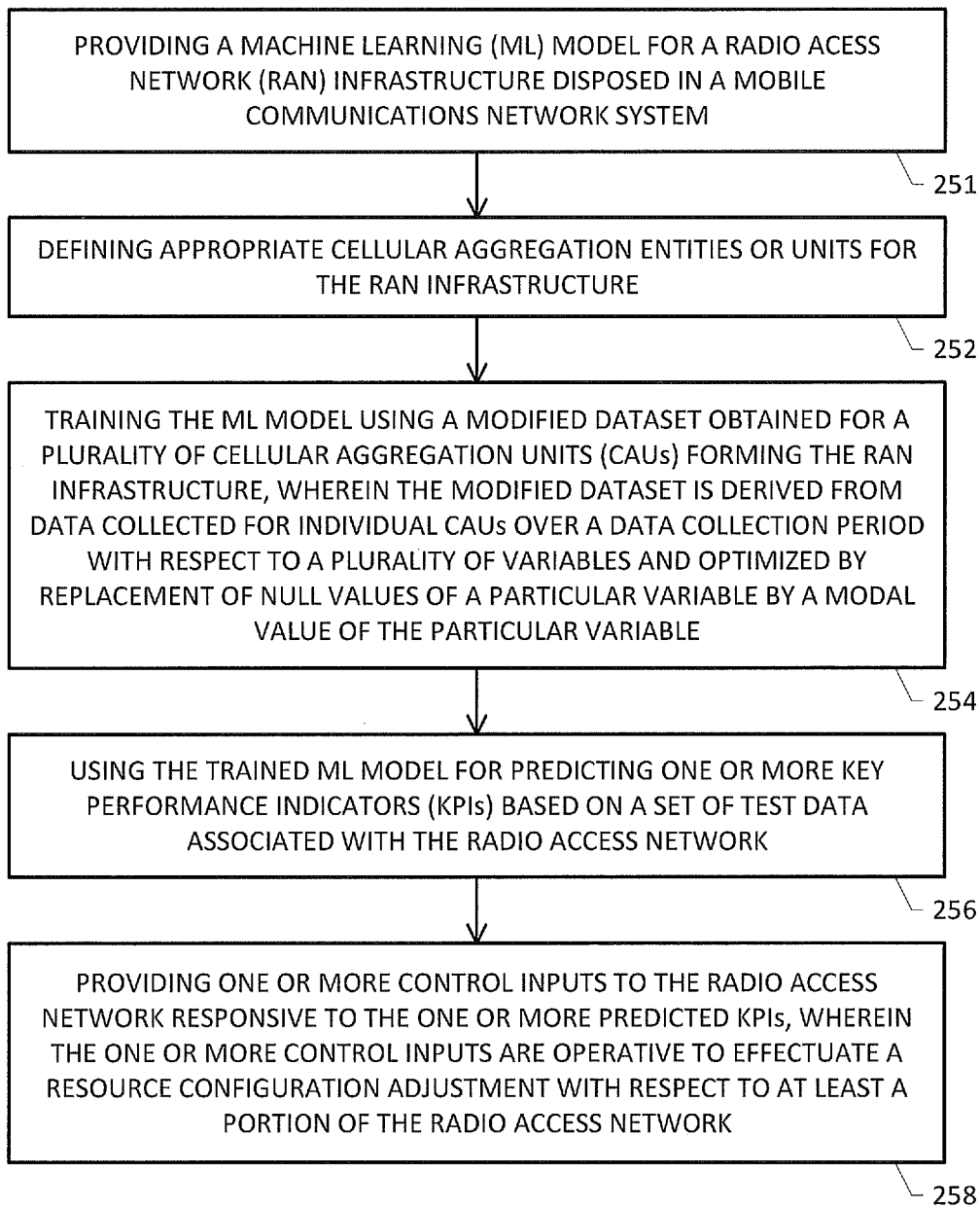
FIG. 2B depicts a flowchart of various blocks, steps and/or acts that may be (re)combined in one or more arrangements, with or without additional flowcharts of the present disclosure, for effectuating input data optimization and performance improvement of a mobile communications system by modifying input data for ML models according to one or more embodiments of the present invention.

FIG. 2B depicts a flowchart of various blocks, steps and/or acts that may be (re)combined in one or more arrangements, with or without additional flowcharts of the present disclosure, for effectuating a process 200B of input data optimization and performance improvement of a mobile communications system by modifying input data for ML models according to one or more embodiments of the present invention. At block 251, one or more suitable ML models for a RAN infrastructure disposed in a mobile communications network system may be provided depending on the modeling objective. As noted above, various ML techniques, algorithms, processes, models, etc., may be configured depending on an ML architecture implementation. Some example techniques may comprise, without limitation, Bayesian Ridge Regressor, Naïve Bayes Classification, Random Forrest Classification, Gaussian Process Regressor, Random Forest Regressor, etc. Further, the ML modeling and associated data preprocessing stack may be deployed as part of the mobile edge, e.g., as part of one or more RAN nodes, or as a separate management node, or as part of a mobile edge cloud (MEC), to reduce control plane latency. At block 252, the RAN infrastructure of the network may be logically defined, segregated, aggregated, classified, or otherwise grouped or categorized at a suitable hierarchical level having a select granularity at which the ML model is designed to provide predictive modeling. For example, in one arrangement, a cellular level analysis may be desired and data for each cell, which may be mapped to a particular sector and a carrier frequency supported by a base station or node, may be obtained. Accordingly, in such an arrangement, the various combinations of sectors and carrier frequencies for each base station, eNB node or gNB node of a RAN may each comprise a different "cell" and therefore form a plurality of aggregation units for which data may be gathered. In another arrangement, a base station node level analysis may be required wherein all the radio resources supported by a base station may be analyzed together. In this arrangement, an aggregation unit may therefore comprise the entire base station, eNB node, gNB node, etc. It should therefore be appreciated that depending on the level of granularity of analysis desired or required, hierarchical level(s) of the network elements deployed in an infrastructural implementation, different types of access technologies involved, as well as the diversity and heterogeneity of cells of a RAN architecture, etc., various levels of aggregation units may be defined for which data may be gathered in an example embodiment of the present invention. Accordingly, depending on the RAT implementation(s) involved, a RAN infrastructure may be defined, segregated or grouped as a plurality of logical units or entities, referred to herein as cellular aggregation units or CAUs, at one more hierarchical levels having different aggregation granularities, as set forth at block 252. By way of illustration, example CAUs may comprise one or more eNodeBs, gNodeBs, macrocells, microcells, small cells, femtocells, picocells, cell sectors per eNodeB, combinations of cell sectors and carrier frequencies per eNodeB, cell sectors per gNodeB, combinations of cell sectors and carrier frequencies per gNodeB, RNC nodes, cell sectors per RNC, combinations of cell sectors and carrier frequencies per RNC, RRUs, micro RRUs, RRHs, micro RRHs, BBUs, BBU pools/hubs, BTSs, BSCs, BSSs, and one or more virtual RAN nodes including virtual eNodeBs, virtual gNodeBs, virtual BBUs, virtual BBU hubs, and virtual RNCs, and the like, or a combination thereof. Regardless of the granularity levels of CAUs of a RAN infrastructure, the data collected for the respective CAUs over a data collection period may be preprocessed using a number of defined preprocessing steps whereby a pre-cleaned or reduced dataset is obtained. Further, a modified dataset is obtained from the reduced dataset wherein a modal replacement process is selectively implemented for certain variables such that null values of a particular variable are replaced by a modal value of the particular variable, as set forth at block 254. In one embodiment, the mode of a variable may be determined based on the distribution of the variable during the data collection period. Thereafter, the ML model may be trained using the modified dataset as previously noted. The foregoing operations are also exemplified as part of block 254 in the flowchart of FIG. 2B. At block 256, the trained ML model may be used for predicting one or more KPIs based on a set of test data associated with the RAN infrastructure. In one example embodiment, one or more control inputs may be provided to the RAN management plane responsive to the one or more predicted KPIs, wherein the one or more control inputs are operative to effectuate a network resource configuration adjustment with respect to at least a portion of the RAN resources, as set forth at block 258.

Depending on the RAN infrastructure implementation, various types of data may be collected, wherein some of the data may be reported by the UEs while the other data may be measured or monitored by the network elements. Example measurements may comprise intra-frequency measurements, inter-frequency measurements, inter-RAT measurements, traffic volume measurements, quality measurements, UE internal measurements, positioning/geolocation measurements, and the like. By way of illustration, example variables that may be measured for an LTE implementation may include, without limitation, one or more of the following: session setup success rate, Radio Resource Control (RRC) connection setup success rate, initial E-UTRAN Radio Access Bearer (ERAB) establishment success rate, added ERAB establishment success rate, signaling setup success rate, contention based random access success rate, session abnormal release rate, ERAB abnormal release date, ERAB retainability, UE context abnormal release rate, intra frequency handover success rate, inter frequency handover success rate, Call Setup Fall-Back (CSFB) success rate, Single Radio Voice Call Continuity (SRVCC) success rate, downlink (DL) user throughput, uplink (UL) user throughput, DL cell throughput, UL cell throughput, DL latency, DL packet loss rate, UL packet loss rate, Media Access Control (MAC) DL block rate error (BLER) percentage, MAC UL BLER percentage, Packet Data Convergence Protocol (PDCP) DL data volume, PDCP UL data volume, DL radio utilization, UL radio utilization, DL Physical Resource Block (PRB) utilization, UL PRB utilization, Control Channel Element (CCE) utilization on Physical Downlink Control Channel (PDCCH), average number of RRC connected users, average number of DL active users, number of RRC connection attempts, Signal-to-Interference plus Noise (SINR) of Physical Uplink Shared Channel (PUSCH), SINR of Physical Uplink Control Channel (PUCCH), Channel Quality Indicator (CQI) metrics, average RRSI, number of ERAB attempts, number of ERAB failures, number of establishment attempts, number of establishment successes, number of connection drops, Quality of Service (QoS) Class Identifier (QCI) accessibility percentages, QCI retainability percentages, Voice over Long Term Evolution (VoLTE) call attempts, global positioning data, number of critical alarm counts, number of major alarm counts, number of minor alarm counts, Inter Radio Access Technology (IRAT) handover rate, DL spectral efficiency rate, (bps/Hz/cell), and UL spectral efficiency rate (bps/Hz/cell), etc. Example KPIs corresponding to one or more of the foregoing variables at an aggregate level may therefore comprise the average number of active users, average cell throughput download, average cell throughput upload, cell availability, maximum cell throughput download, maximum cell throughput upload, and upload traffic volume (e.g., in GB), and the like.

Figure 3:
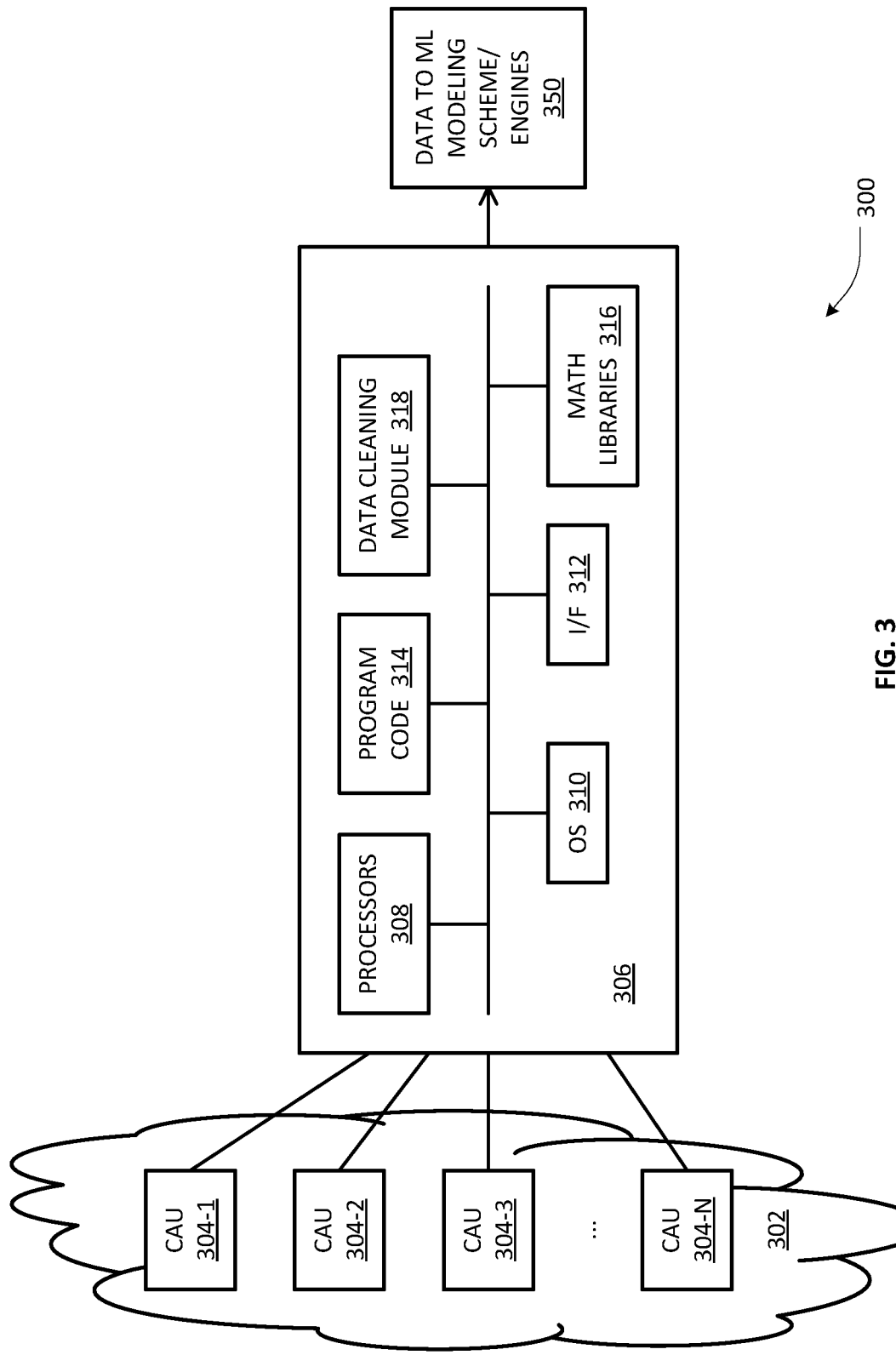
FIG. 3 depicts a block diagram of an apparatus, node, or network element functionality associated with a network portion according to an embodiment of the present invention.

FIG. 3 depicts a block diagram of an apparatus, node, or network element functionality associated with a network portion according to an embodiment of the present invention. An example network portion 300 includes a RAN portion 302 wherein various RAN infrastructure elements are logically defined as a plurality of CAUs 304-1 to 304-N in accordance with the teachings herein. A network node or functionality 306 may be local to the RAN portion 302 or remotely disposed, e.g., as a management node at a higher hierarchical level of a communications network, as a cloud-based service node, etc. as previously noted. One or more processors 308 and associated operating system (OS) environment 310 may be configured to execute suitable program code or service logic 314 in conjunction with a data cleaning module 318 for performing one or more processes set forth the present patent application. In one arrangement, data cleaning module 318 may comprise a data processing stack that may interoperate with one or more mathematical, statistical and/or other functional libraries 316 for facilitating various processing steps regarding input data collected from CAUs 304-1 to 304-N for a plurality of variables. Although not specifically shown in FIG. 3, various performance monitors, data collectors and schedulers, etc. may be interfaced with the network element 306 for facilitating data collection from RAN 302 at select aggregated unit levels. As previously noted, mobile network KPIs are not necessarily limited to standard radio measurements or statistics related to protocol events, and may comprise indicators that describe overall system performance in many other domains such as, e.g., resource utilization, internal system events, RRM statistics, among others. Upon performing suitable data preprocessing steps, the cleaned/modified data including modal replacement of null values may be provided to one or more ML modeling schemes or engines 350 for purposes of some embodiments herein. Depending on a particular implementation of the network element functionality 306, various network interfaces 312 may be provided for interfacing with the RAN infrastructure elements, ML engines, OSS/BSS nodes, network management or operation centers (NMCs/NOCs), and the like.

Figure 4:
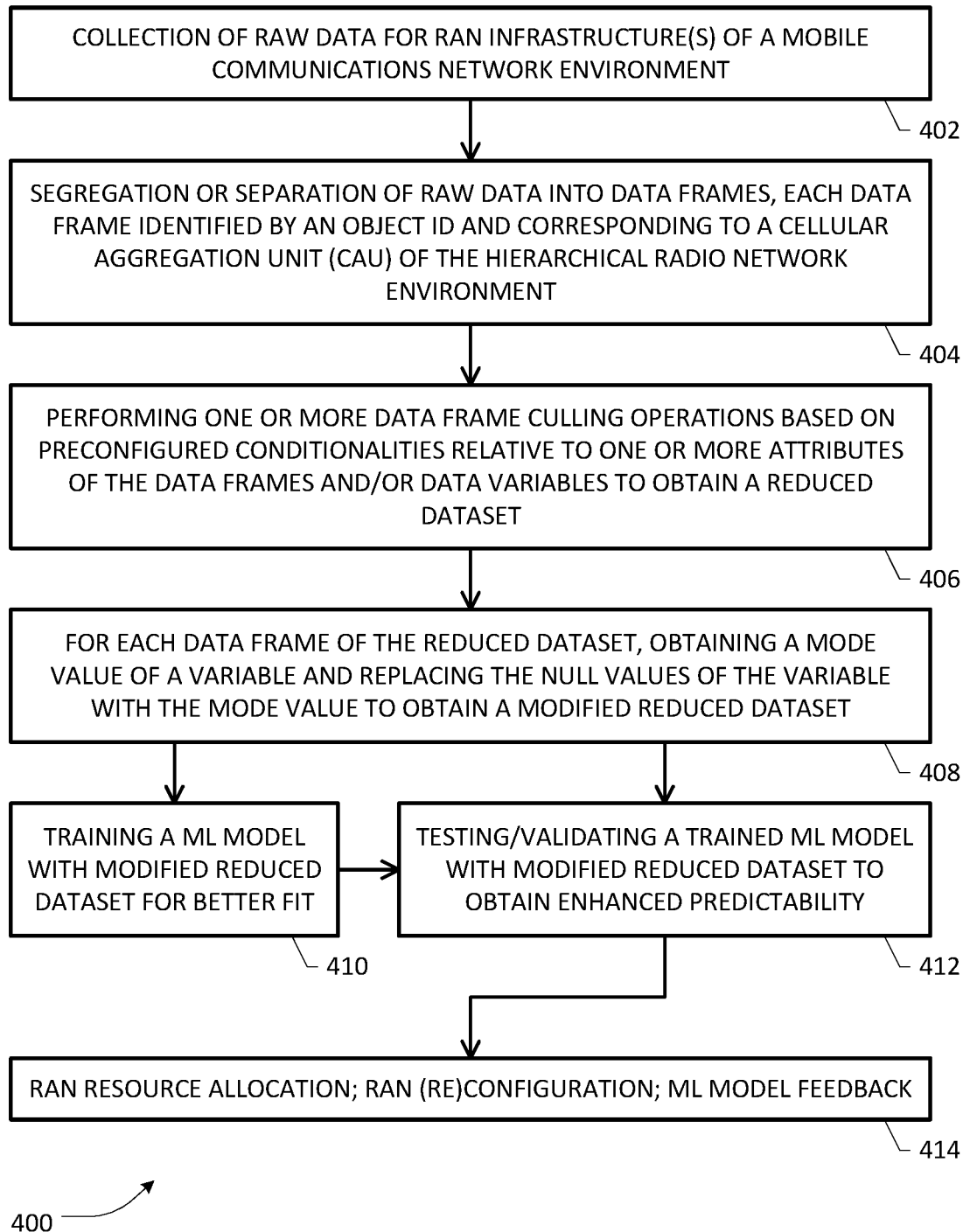
FIGS. 4 and 5 depict flowcharts of various blocks, steps and/or acts that may be (re)combined in one or more arrangements, with or without additional flowcharts of the present disclosure for purposes of one or more embodiments of the present invention.
Figure 5:
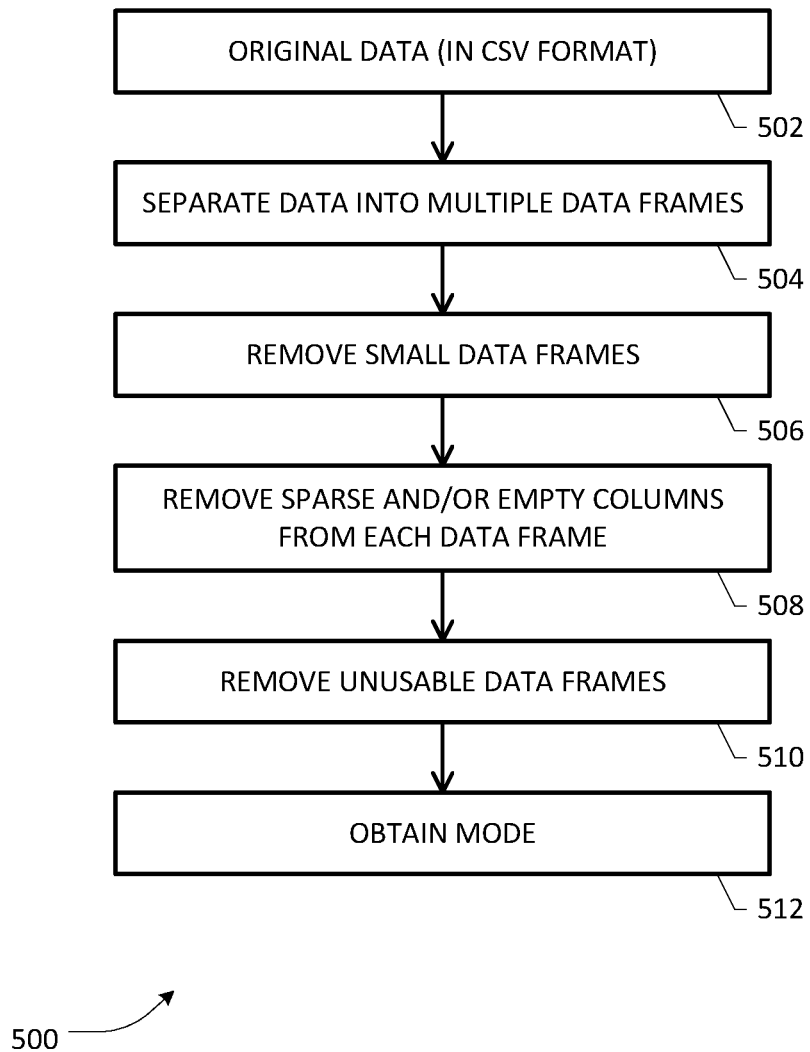

FIGS. 4 and 5 depict flowcharts of various blocks, steps and/or acts that may be (re)combined in one or more arrangements, with or without additional flowcharts of the present disclosure for purposes of one or more embodiments of the present invention. Example process 400 is representative of an overall flow of an ML-based implementation for a RAN based on input dataset optimization. At block 402, raw data pertaining to a plurality of variables for the RAN infrastructure elements of a mobile communications network environment may be obtained based on appropriate aggregation granularity levels. At block 404, the data may be segregated or separated into a plurality of data frames, wherein each data frame may be identified by an object identifier (ID), indicium, etc., corresponding to a CAU of the RAN infrastructure. At block 406, one or more data frame culling operations and/or variable removal processes may be performed based on preconfigured conditionalities/constraints relative to one or more attributes of the data frames and/or data variables to obtain a reduced dataset. Thereafter, for each data frame of the reduced dataset, a mode value of a variable is obtained. According to the teachings herein, the mode value of the variable is used for replacing the null values of the variable so as to obtain a modified reduced dataset, also referred to as a modified dataset in general, as set forth at block 408. In one aspect, an ML model is trained based on the modified dataset for obtaining a better-fitted trained model (block 410). In a related aspect, the trained ML model may be used for testing/validating based on subsequent data collections that are also processed as set forth above (block 412). In some embodiments, KPIs, parameters and/or variables predicted by the trained and validated ML model may be provided as inputs to drive network optimization, scheduling, RF allocation and planning, automatic cell planning, as well as management and planning of neighbors and physical cell IDs, etc., as exemplified at block 414. In some embodiments involving additional and/or optional aspects of a predictive modeling implementation, appropriate forecasts may be made as to when certain KPI(s) or performance indicators may breach defined quality thresholds, which may help facilitate the proactive generation of suitable remedial actions by the network operator. It should be appreciated that having incomplete, missing or incorrectly imputed data values degrades accuracy of the forecast and hence has a negative impact on infrastructure upgrade schedules as well as the physical plant requirements by either over-predicting or under-predicting outage nodes and deployment timing.

At least certain aspects of the foregoing data cleaning process flow may be implemented in conjunction with known ML processes such as feature engineering, dimensionality reduction, and the like, in some embodiments. In terms of quantifying validation or fitting accuracy of an ML model that is trained based on cleaned data according to the embodiments herein, various performance metrics may be employed such as, e.g., the coefficient of determination ($R^2$ or $r^2$), mean absolute error (MAE), mean squared error (MSE), root MSE (RMSE), normalized RMSE, the coefficient of variation (CV), and the like.

Turning to FIG. 5, process 500 is representative of a flow that includes example data frame culling and variable reduction operations that may be used in combination with one or more processes set forth herein for purposes of an embodiment of the present disclosure. At block 502, original or raw data from RAN infrastructure aggregation units may be obtained in a known or heretofore unknown format. For example, a delimiter-separated format such as a comma-separated values (CSV) format may be used for the original data, wherein a delimited text file uses a comma or some other delimiter to separate values for storing tabular data. As noted previously, data may be obtained at one or more levels of aggregation granularity and over a defined period of time. Depending on the data collection period, an original dataset may comprise millions of rows and several tens or hundreds of columns corresponding to the monitored plurality of KPI variables. At block 504, the data is separated or segregated or grouped into multiple data frames, each data frame grouping corresponding to an aggregation unit (e.g., eNodeBs). It should be appreciated that such a separation may be advantageous with respect to a RAN because not only the patterns for each eNodeB may be different but the KPIs affecting each eNodeB may also be different due to the varying external factors, e.g., such as the type of area the node is in. At block 506, data frames that do not have enough row entries for a corresponding CAU are removed from prediction and/or training (e.g., based on a defined threshold value, which may depend on human and/or AI-based domain experts, advanced analytics, etc.). By way of a non-limiting example, a determination may be made whether a data frame grouping associated with an eNodeB has less than 100 entries or rows. If so, such data frames may be removed from the database. In one embodiment, each data frame of a grouping corresponding to a CAU may comprise a row of data collected for the plurality of variables at a particular time point in the data collection period. In one example arrangement, groupings having less than a threshold number of rows are not used because such data frame groups may contain incomplete data, potentially giving rise to inaccurate results. On the other hand, such data frame groups may be important from a network maintenance perspective since the condition of not having data may mean that there may be certain critical issues with respect to the eNodeB/node (e.g., the node was set up later than the remaining nodes relative to the commencement of data collection, or the node was not functioning properly for some time during the data collection period, etc.). At block 508, sparsely populated columns (including empty columns) from the data frames are removed. A threshold value for determining sparseness of a column may be configured depending on implementation. For example, if a column, i.e., a monitored variable, has fewer than a select number of entries (e.g., less than 50% to 80% or so) over the data collection period, such a column may be removed from analysis. As such, columns that are empty do not provide a lot of information. In addition, such columns can reduce the accuracy of prediction in a predictive modeling scheme. In some arrangements, even if certain imputed data entries may be used for populating such variables, they may not be very useful. It should be appreciated that in removing sparse/empty columns, the resulting dataset may comprise data frames that may have different non-sparse or significant columns. In some implementations, such a condition of the dataset may be particularly useful since it may help distinguish and discriminate between inter-node and/or intra-node behaviors and inter-actions. At block 510, unusable data frames may be removed depending on whether or not there are enough KPI variables containing data entries. By way of example, if more than for a threshold number of valid KPI variables (e.g., 15% to 30% or so) are not present in the data frames after removing the columns, such data frames may be removed. Stated differently, if the number of KPI variables is less than 85% or 70% of the valid KPI variables in a data frame, such a data frame is removed. In one example arrangement, nodes or aggregation units corresponding to such data frames may be analyzed separately, e.g., by classifying them as faulty because there is not enough data and more data needs to be present. Such nodes may therefore be analyzed further in a separate process involving, e.g., a suitable Fault, Configuration, Accounting, Performance and Security model. After performing the foregoing operations, which may be executed in different sequences, orders, or combinations thereof depending on implementation, a mode value is obtained for each variable of the remaining reduced dataset (block 512). As described previously, the reduced dataset may be further modified by replacing the null values of a variable with the mode value of the variable computed over the distribution obtained during the data collection period to obtain a modified dataset.

According to some embodiments, modal value replacement of null values is particularly useful with respect to various types of data collected in RAN networks, wherein the data can comprise categories such as cardinal data, nominal data, ordinal data, rank order data, continuous variable data, discrete variable data, categorical data, boolean data, and the like. Further, imputation of missing values by the mode of a distribution rather than the statistical mean or median, or some other predetermined value, e.g., a maximum value or a minimum value of the range of the distribution, is better suited for skewed distributions of data, thereby increasing reliability and consistency of datasets. The mode of a distribution is a better indicator of the centroid of a probability mass function or distribution for replacement since it is the value that appears most often (i.e., maximally occurring value) and most likely to be sampled. Such data curation is not only beneficial in improving the accuracy of predictive analytical models based on ML techniques, statistical and mathematical modeling, etc., when used for input data cleaning, but curated datasets may also be provided in the context of data storage prior to further analysis.

An embodiment of a data cleaning process according to the teachings set forth herein may be implemented as a set of program instructions, code, pseudo-code, or algorithmic process, exemplified below:

TABLE 1

```
==========================================================
z = list( )
df1 = list of unique eNodeBs
for(i in 1 to sizeof(df1))
       z[[i]] = corresponding eNodeB data
z = list of all eNodeB data frames
y = list( )
j = 1
for(i in 1 to sizeof(df1))
       newdf1 = z[[i]]
       if(sizeof(newdf1) > 100)
              y[[j]] = newdf1
              j++
y = list of eNodeBs with more than 100 rows
x = list( )
df2 = list of unique eNodeBs
```

TABLE 1-continued

```
for(i in 1 to sizeof(df2))
     newdf2 = y[[i]]
     k = 1
for(j in 1 to columns(newdf1))
          if(used.columns > 80% column.size)
                newdf3[k] = newdf2[j]
                k++
     x[[i]] = newdf3
x = list of eNodeBs with cleaned column data
w = list( )
j = 1
for(i in 1 to sizeof(df2))
     newdf4 = x[[i]]
     k = 0
     l = 0
for(j in 1 to columns(newdf4))
          newdf5[j] = percentage of cells not NULL in newdf4[j]
     for(j in 1 to columns(newdf4))
          if(newdf5[j] > 80)
                newdf6[k] = newdf4[j]
                k++
     if(k > 0.75*columns(newdf4))
          w[[l]] = newdf6
          l++
w = list of eNodeBs with more than 75% columns available from original
data
v = list( )
df3 = list of unique eNodeBs in w
for(i in 1 to sizeof(df3))
     newdf7 = w[[i]]
     for(j in 1 to columns(newdf7))
          if.na(newdf7[j]) = Mode that is not NA
     v[[i]] = newdf7
v = final cleaned data set
=====================================================
```

It will be apparent to one skilled in the art that an embodiment of the foregoing process may be implemented in a number of computer programming languages and software environments, e.g., object-oriented programming environments based on R or Python programming language and associated libraries, that may be particularly suited for statistical and graphical techniques, linear and nonlinear modeling, time-series analysis, classification, clustering, etc.

Figure 6:
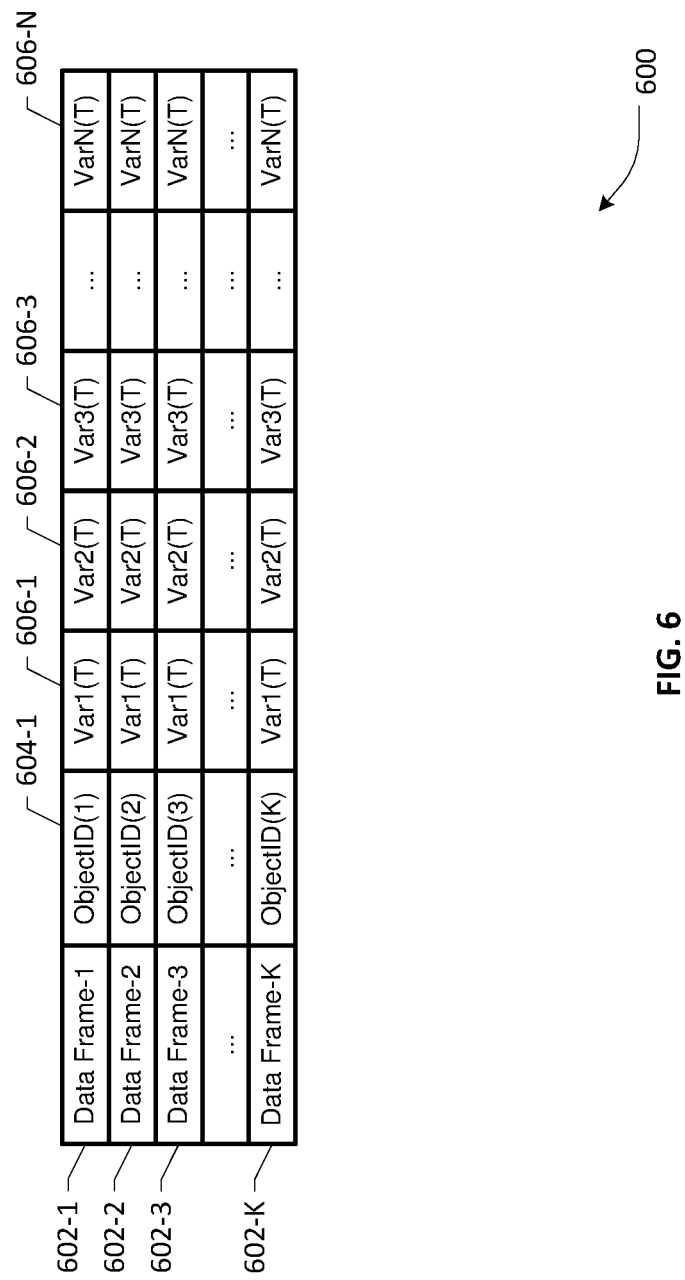
FIG. 6 depicts a representative input dataset structure prior to modification according to the teachings herein with respect to data cleaning and preprocessing for purposes of an example embodiment.

FIG. 6 depicts a representative input dataset 600 prior to modification according to the teachings herein with respect to data cleaning and preprocessing for purposes of an example embodiment. As illustrated, dataset 600 comprises data segregated into data frame objects 602-1 to 602-K corresponding to a plurality of RAN aggregation units identified by respective ObjectID(i), i=1, 2, . . . , K, as represented by column 604. Data collected for a plurality of KPI variables, e.g., Var1 to VarN, over a period of time T is represented as columns 606-1 to 606-N. Dataset 600 may be structured using known or heretofore unknown data structures, database schema, and the like. Regardless of how the dataset 600 may be organized, if the number of rows of data or records associated with a particular data frame is less than a threshold, that data frame may be deleted as part of data culling operations set forth above. By way of illustration, if DataFrame-2 corresponding to ObjectID(2) is less than a defined threshold, e.g., 100, that data frame may be removed from the dataset as indicated in the embodiment set forth above. Likewise, other data culling operations and/or column removals may be executed to obtain a reduced dataset, which is further modified by mode value imputation as discussed previously, wherein the substitution VarX{NULL}←Mode{VarX(T)}, X=1, 2, . . . , N, may be performed for each remaining data frame of the reduced dataset.

Figure 7:
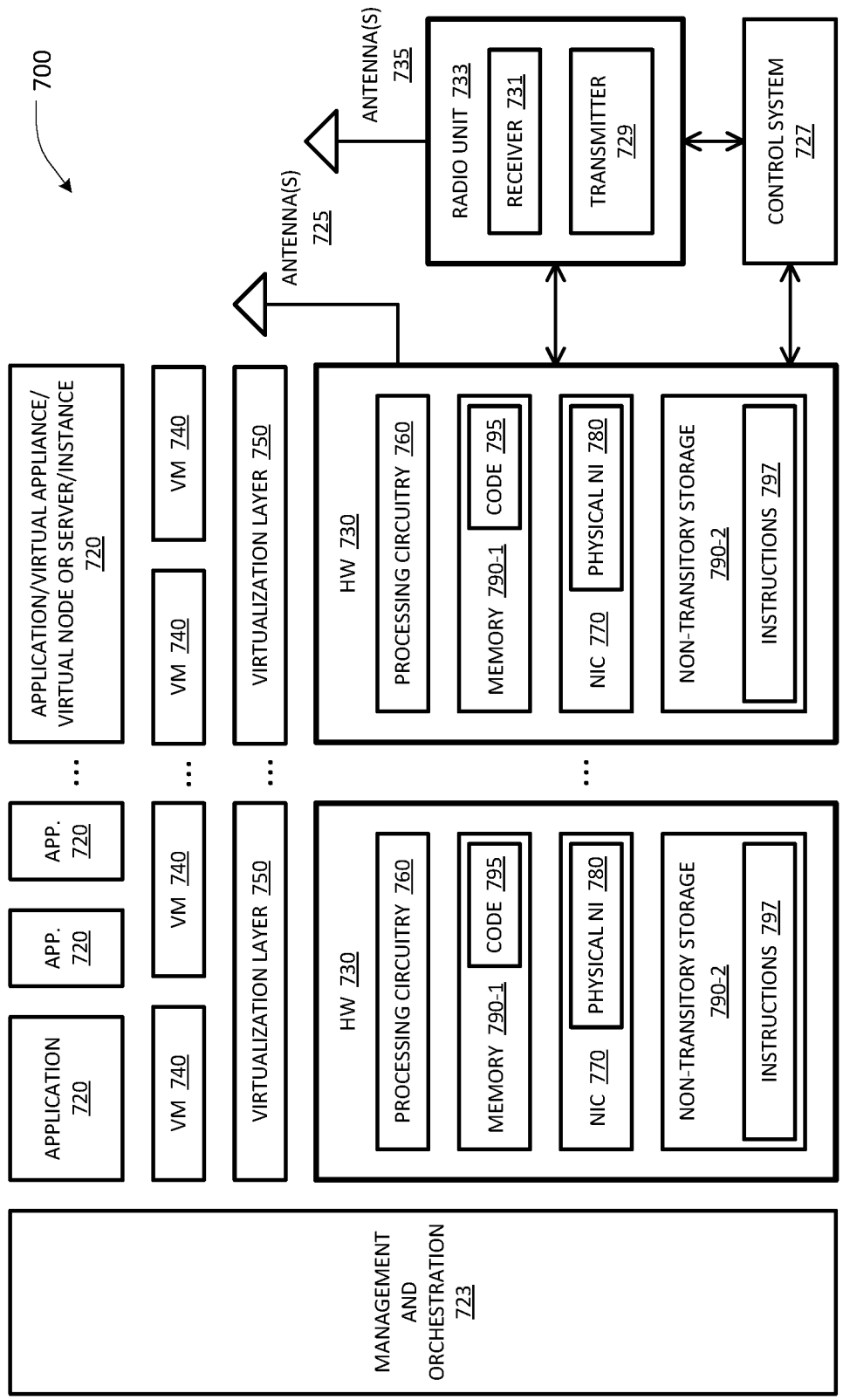
FIG. 7 depicts a virtualization environment wherein an embodiment of the present patent disclosure may be practiced in accordance with the teachings herein.

FIG. 7 depicts a virtualization environment wherein an embodiment of the present patent disclosure may be practiced in accordance with the teachings herein. By way of illustration, example virtualization environment 700 is shown as a schematic block diagram in which functions implemented by or in association with some embodiments may be virtualized. In the present context, "virtualizing" means creating virtual versions of apparatuses or devices, which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical/virtual processing nodes in one or more networks, e.g., internal networks, external networks, intranets, extranets, private/public/hybrid cloud networks, etc.).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node, a management node, etc.), then the network node may be entirely virtualized.

Various functionalities may be implemented by one or more applications 720 (which may alternatively be called software instances, virtual appliances, network functions, virtual nodes, virtual network functions, etc.), preferably operative to implement some of the features, functions, and/or benefits of some of the embodiments disclosed herein. Applications 720 are run in virtualization environment 700, which provides hardware 730 comprising processing circuitry 760 and memory 790-1. Memory 790-1 contains instructions or code portions 795 executable by processing circuitry 760 whereby application 720 is operative to provide one or more of the features, benefits, and/or functions disclosed herein.

Virtualization environment 700 may be implemented using general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 797 and/or instructions executable by processing circuitry 760. Software 797 may include any type of software including software for instantiating one or more virtualization layers 750 (also referred to as hypervisors), software to execute virtual machines 940 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 920 may be implemented on one or more of virtual machines 740, and the implementations may be made in different ways.

During operation, processing circuitry 760 executes software 795/797 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Some hardware 730 may comprise antenna 925 and may implement some functions associated therewith via virtualization. Alternatively, hardware 930 may be part of a larger cluster of hardware (e.g. such as in a data center or customer premise equipment (CPE)) where many hardware nodes work together and are managed via management and orchestration (MANO) 723, which, among others, oversees lifecycle management of applications 720, and may be associated and/or integrated with an OSS/BSS platform. Further, an example UE or endpoint node may include one or more antennas 735 and a radio unit 733 having a receiver 731 and a transmitter 929, operative under a processor/control system 727, some of which aspects may also be virtualized in some arrangements (e.g., "thin" clients).

Virtualization of the hardware is in some contexts referred to as Network Function Virtualization (NFV), as pointed out elsewhere the present patent disclosure. NFV may be used to consolidate many network equipment types onto industry standard high volume server hardware, physical switches, and physical storage, which can be located in data centers, and customer premise equipment. In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network element (VNE). Still in the context of NFV, a VNF or Virtual Network Function may be responsible for handling specific network functions and/or other services and applications that run in one or more virtual machines 740 on top of hardware networking infrastructure 730 and generally corresponds to application 720 in FIG. 7. A plurality of VNF managers may be provided as part of MANO 723 for managing and orchestrating the overall functionality of VNFs, at least a portion of which may related to one or more aspects of a RAN diagnostics, support and management application or service as disclosed herein.

In some embodiments, accordingly, functionalities relating to RAN data collection, data cleaning, RAN cloud ecosystem diagnostics and support management, ML modeling, reporting, administration, analytics, etc., may be implemented as one or more VNFs operative with suitable databases configured for storing RAN cell site diagnostics data, core network infrastructure diagnostics data, virtualized infrastructure diagnostics data, etc. With respect to predictive modeling, various aspects of network management, such as, e.g., traffic prediction, traffic classification, traffic routing, congestion control, resource management, fault management, QoS/QoE management, network security, and the like, may be modeled using appropriate ML engines (supervised, unsupervised, semi-supervised, reinforcement learning, etc.), which may also be configured as VNFs in an example virtualized environment.

Based on the foregoing, skilled artisans will recognize that embodiments herein advantageously facilitate improved data curation and preparation with respect to the data obtained from various performance counters and mobile network KPIs collected at different levels of aggregation granularity, which in turn contributes to better predictive modeling of RAN performance. Using network KPIs for optimization may be particularly cost effective in some embodiments since such information may already be available at the OSS level in some implementations. Further, mobile network KPIs may be collected for various durations of time from the RAN in iterative manner in order to better fit or train a particular ML model. As such, network KPIs, in association with OSS counters in some embodiments, may be configured to encompass data pertaining to all users, taking into account their real experience in terms of radio conditions, indoor losses and traffic distribution for providing better predictability in an example deployment.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a RAM circuit, a ROM circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the scope of the claims appended below.

The invention claimed is:

1. A method operative with a radio access network (RAN) infrastructure disposed in a mobile communications network environment, the method comprising:
   obtaining data from a plurality of cellular aggregation units (CAUs) forming the RAN infrastructure, the data collected for individual CAUs over a data collection period with respect to a plurality of variables;
   separating the data into a plurality of data frames, each data frame identified by an object identifier and corresponding to a respective individual CAU;
   performing data cleaning operations in a particular sequential order as follows:
   removing data frames that have less than a threshold number of rows for each data frame, wherein each row corresponds to a time point of the data collection period at which data for the plurality of variables is collected;
   removing sparse columns corresponding to variables from each data frame that have less than a select number of entries collected during the data collection period;
   removing data frames that have less than a select number of variables corresponding to a designated number of valid key performance indicators (KPIs), thereby obtaining a reduced dataset; and
   performing following operations for each remaining data frame of the reduced dataset to obtain a modified dataset therefrom:
   determining a modal value for each of remaining variables of the data frame; and
   if a particular variable contains a null value, replacing the null value with the modal value of the particular variable.

2. The method as recited in claim 1, further comprising defining the plurality of CAUs of the RAN infrastructure at one or more hierarchical levels having different aggregation granularities selected from at least one of: eNodeBs, gNodeBs, macrocells, microcells, small cells, femtocells, picocells, cell sectors per eNodeB, combinations of cell sectors and carrier frequencies per eNodeB, cell sectors per gNodeB, combinations of cell sectors and carrier frequencies per gNodeB, radio network controller (RNC) nodes, cell sectors per RNC, combinations of cell sectors and carrier frequencies per RNC, remote radio units (RRUs), micro RRUs, remote radio heads (RRHs), micro RRHs, baseband units (BBUs), BBU hubs, base transceiver stations (BTSs), base station controllers (BSCs), base station subsystems (BSSs) and one or more virtual RAN nodes including virtual eNodeBs, virtual gNodeBs, virtual BBUs, virtual BBU hubs, and virtual RNCs.

3. The method as recited in claim 1, wherein the data collected with respect to the plurality of variables comprises at least one of cardinal data, ordinal data, rank order data, nominal data, boolean variable data, alphanumerical data, categorical data, continuous variable data, and discrete variable data.

4. The method as recited in claim 1, wherein the plurality of variables comprise variables selected from at least one of: session setup success rate, Radio Resource Control (RRC) connection setup success rate, initial E-UTRAN Radio Access Bearer (ERAB) establishment success rate, added ERAB establishment success rate, signaling setup success rate, contention based random access success rate, session abnormal release rate, ERAB abnormal release date, ERAB retainability, user equipment (UE) context abnormal release rate, intra frequency handover success rate, inter frequency handover success rate, Call Setup Fall-Back (CSFB) success rate, Single Radio Voice Call Continuity (SRVCC) success rate, downlink (DL) user throughput, uplink (UL) user throughput, DL cell throughput, UL cell throughput, DL latency, DL packet loss rate, UL packet loss rate, Media Access Control (MAC) DL block rate error (BLER) percentage, MAC UL BLER percentage, Packet Data Convergence Protocol (PDCP) DL data volume, PDCP UL data volume, DL radio utilization, UL radio utilization, DL Physical Resource Block (PRB) utilization, UL PRB utilization, Control Channel Element (CCE) utilization on Physical Downlink Control Channel (PDCCH), average number of RRC connected users, average number of DL active users, number of RRC connection attempts, Signal-to-Interference plus Noise (SINR) of Physical Uplink Shared Channel (PUSCH), SINR of Physical Uplink Control Channel (PUCCH), Channel Quality Indicator (CQI) metrics, average RRSI, number of ERAB attempts, number of ERAB failures, number of establishment attempts, number of establishment successes, number of connection drops, Quality of Service (QoS) Class Identifier (QCI) accessibility percentages, QCI retainability percentages, Voice over Long Term Evolution (VoLTE) call attempts, global positioning data, number of critical alarm counts, number of major alarm counts, number of minor alarm counts, Inter Radio Access Technology (IRAT) handover rate, DL spectral efficiency rate, and UL spectral efficiency rate.

5. The method as recited in claim 1, further comprising:
providing a machine learning (ML) model for the radio access network (RAN) infrastructure;
training the ML model using the modified dataset to obtain improved accuracy in predictive performance;
executing the trained ML model for predicting one or more key performance indicators (KPIs) based on a set of online test data associated with the RAN infrastructure, the online test data obtained subsequent to training the ML model; and
providing one or more control inputs to the RAN infrastructure responsive to the one or more predicted KPIs, wherein the one or more control inputs are operative to effectuate a resource configuration adjustment with respect to at least a portion of the RAN infrastructure.

6. A network element associated with a mobile communications network, the network element comprising:
one or more processors; and
one or more persistent memory modules coupled to the one or more processors, the one or more persistent memory modules having program instructions stored thereon that perform a data conditioning method operative with the mobile communications network when executed by the one or more processors of the network element, the program instructions comprising:
a code portion for obtaining data from a plurality of cellular aggregation units forming a RAN infrastructure of the mobile communications network, the data collected for individual CAUs over a data collection period with respect to a plurality of variables;
a code portion for separating the data into a plurality of data frames, each data frame identified by an object identifier and corresponding to a respective individual CAU;
a code portion for performing data cleaning operations in a particular sequential order as follows:
removing data frames that have less than a threshold number of rows for each data frame, wherein each row corresponds to a time point of the data collection period at which data for the plurality of variables is collected;
removing sparse columns corresponding to variables from each data frame that have less than a select number of entries the data collection period; and
removing data frames that have less than a select number of variables corresponding to a designated number of valid key performance indicators (KPIs), thereby obtaining a reduced dataset; and
a code portion performing following operations for each remaining data frame of the reduced dataset to obtain a modified dataset therefrom:
determining a modal value for each of remaining variables of the data frame; and
if a particular variable contains a null value, replacing the null value with the modal value of the particular variable.

7. The network element as recited in claim 6, wherein the program instructions further comprise a code portion for defining the plurality of CAUs of the RAN infrastructure at one or more hierarchical levels having different aggregation granularities selected from at least one of: eNodeBs, gNodeBs, macrocells, microcells, small cells, femtocells, picocells, cell sectors per eNodeB, combinations of cell sectors and carrier frequencies per eNodeB, cell sectors per gNodeB, combinations of cell sectors and carrier frequencies per gNodeB, radio network controller (RNC) nodes, cell sectors per RNC, combinations of cell sectors and carrier frequencies per RNC, remote radio units (RRUs), micro RRUs, remote radio heads (RRHs), micro RRHs, baseband units (BBUs), BBU hubs, base transceiver stations (BTSs), base station controllers (BSCs), base station subsystems (BSSs) and one or more virtual RAN nodes including virtual eNodeBs, virtual gNodeBs, virtual BBUs, virtual BBU hubs, and virtual RNCs.

8. The network element as recited in claim 6, wherein the data collected with respect to the plurality of variables comprises at least one of cardinal data, ordinal data, rank order data, nominal data, boolean variable data, alphanumerical data, categorical data, continuous variable data, and discrete variable data.

9. The network element as recited in claim 6, wherein the plurality of variables comprise variables selected from at least one of: session setup success rate, Radio Resource Control (RRC) connection setup success rate, initial E-UTRAN Radio Access Bearer (ERAB) establishment success rate, added ERAB establishment success rate, signaling setup success rate, contention based random access success rate, session abnormal release rate, ERAB abnormal release date, ERAB retainability, user equipment (UE) context abnormal release rate, intra frequency handover success rate, inter frequency handover success rate, Call Setup Fall-Back (CSFB) success rate, Single Radio Voice Call Continuity (SRVCC) success rate, downlink (DL) user throughput, uplink (UL) user throughput, DL cell throughput, UL cell throughput, DL latency, DL packet loss rate, UL packet loss rate, Media Access Control (MAC) DL block rate error (BLER) percentage, MAC UL BLER percentage, Packet Data Convergence Protocol (PDCP) DL data volume, PDCP UL data volume, DL radio utilization, UL radio utilization, DL Physical Resource Block (PRB) utilization, UL PRB utilization, Control Channel Element (CCE) utilization on Physical Downlink Control Channel (PDCCH), average number of RRC connected users, average number of DL active users, number of RRC connection attempts, Signal-to-Interference plus Noise (SINR) of Physical Uplink Shared Channel (PUSCH), SINR of Physical Uplink Control Channel (PUCCH), Channel Quality Indicator (CQI) metrics, average RRSI, number of ERAB attempts, number of ERAB failures, number of establishment attempts, number of establishment successes, number of connection drops, Quality of Service (QoS) Class Identifier (QCI) accessibility percentages, QCI retainability percentages, Voice over Long Term Evolution (VoLTE) call attempts, global positioning data, number of critical alarm counts, number of major alarm counts, number of minor alarm counts, Inter Radio Access Technology (IRAT) handover rate, DL spectral efficiency rate, and UL spectral efficiency rate.

10. The network element as recited in claim 6, wherein the program instructions further comprise:
   a code portion for configuring a machine learning (ML) model for the radio access network (RAN) infrastructure;
   a code portion for training the ML model using the modified dataset to obtain improved accuracy in predictive performance;
   a code portion for executing the trained ML model for predicting one or more KPIs based on a set of online test data associated with the RAN infrastructure, the online test data obtained subsequent to training the ML model; and
   a code portion for providing one or more control inputs to at least a portion of the RAN infrastructure responsive to the one or more predicted KPIs, wherein the one or more control inputs are operative to effectuate a resource configuration adjustment with respect to the at least a portion of the RAN infrastructure.

11. The network element as recited in claim 6, wherein the RAN infrastructure comprises a network infrastructure selected from at least one of a Long Term Evolution (LTE) infrastructure, a Global System for Mobile Communications (GSM) radio access network (GRAN) infrastructure, an Enhanced Data Rates for Global System for Mobile Communications (GSM) Evolution (EDGE) network (GERAN) infrastructure, a $3^{rd}$ Generation network infrastructure, a $4^{th}$ Generation network infrastructure, a $5^{th}$ Generation network infrastructure, an Integrated Digital Enhanced Network (IDEN) infrastructure, a WiMAX infrastructure, a heterogeneous access network infrastructure, a Code Division Multiple Access (CDMA) network infrastructure, a Universal Mobile Telecommunications System (UMTS) network infrastructure, a Universal Terrestrial Radio Access Network (UTRAN) infrastructure, an All-IP Next Generation Network (NGN) infrastructure, an 802.11 class WiFi communications infrastructure, a HiperLAN infrastructure, and a HiperMAN infrastructure, and an NTN infrastructure.

* * * * *